United States Patent [19]
Washabaugh

[11] Patent Number: 5,481,922
[45] Date of Patent: Jan. 9, 1996

[54] ELASTIC TRANSDUCER DESIGNS INCORPORATING FINITE LENGTH MEASUREMENT PATHS

[76] Inventor: Peter D. Washabaugh, 626 Westwood, Ann Arbor, Mich. 48103

[21] Appl. No.: 251,536

[22] Filed: May 31, 1994

[51] Int. Cl.$^6$ .................................................. G01B 11/00
[52] U.S. Cl. .................................................. 73/774; 73/800
[58] Field of Search ........................ 73/774, 775, 800, 73/788

[56] References Cited

U.S. PATENT DOCUMENTS

| | | | |
|---|---|---|---|
| 2,626,337 | 1/1953 | Mitchell | 73/775 |
| 3,246,510 | 4/1966 | Ruge | 73/774 |
| 4,191,470 | 3/1980 | Butter | 356/35.5 |
| 4,295,738 | 10/1981 | Meltz et al. | 73/800 |
| 4,360,272 | 11/1982 | Schmadel | 356/352 |
| 4,634,852 | 1/1987 | Shaw | 73/657 |
| 4,725,728 | 2/1988 | Brininstool | 250/227 |
| 4,781,741 | 11/1988 | Johnson | 65/21.2 |
| 4,850,693 | 7/1989 | Deason | 356/35.5 |
| 5,011,280 | 4/1991 | Hung | 356/35.5 |
| 5,166,742 | 11/1992 | Kobayashi | 356/35.5 |
| 5,218,197 | 6/1993 | Carroll | 250/227.19 |
| 5,289,256 | 2/1994 | Gramling | 356/345 |

Primary Examiner—Richard E. Chilcot, Jr.
Assistant Examiner—Max H. Noori
Attorney, Agent, or Firm—Young, MacFarlane & Wood

[57] ABSTRACT

The design of transducers utilizing finite length sensor paths is discussed. Within the framework of linear elastostatics of an isotropic homogeneous material the normal, transverse, and shear components of strain along a path can be integrated over a finite length to separate and yield external loading components. These displacement measurements over a long distance accommodate the use of fiber optic displacement sensors. The use of optical interferometric sensors in contrast with electrical strain gauges, has the potential to allow the precision and range of the component measurement to scale with the geometry of the device rather than the maximum strain in the instrument. It becomes possible by virtue of these scaling properties to construct a better transducer. The design of transducers that measure all six resultant-load components using both electrical strain gauges and fiber-optic interferometric sensors are described. An advanced torsion sensor and a linear acceleration transducer are also discussed. In addition, a "null" transducer that is potentially useful as a "structural integrity" sensor is presented. Finally, practical consideratios in the design of finite length sensor path transducers are noted.

12 Claims, 9 Drawing Sheets

3-D VIEW

ELASTIC TRANSDUCER DESIGNS INCORPORATING FINITE LENGTH MEASUREMENT PATHS

FIELD OF THE INVENTION

The invention pertains to strain measuring transducers, and particularly, transducers having electrical or optical sensors of finite measurement path length.

BACKGROUND OF THE INVENTION

In the design and construction of transducers employing the elastic response of a structure, a frequent goal is the isolation of a small, high-strain region that is particularly sensitive to a single component of interest. Such components might include components of load, moment or acceleration. Typically this region is instrumented with a sensor such as an electrical strain gauge. A motivation for placing the gauge in a high-strain region is that the maximum strain seen by the gauge is a limiting factor in its sensitivity. Unfortunately, incorporating high-strain regions in a device usually precludes its use as a direct or critical load bearing element. One consequence of limiting the strain in a structure is that "smart" devices (e.g. "smart structures") incorporating imbedded strain sensors (e.g. piezo-electrics) would have commensurately lower sensitivity.

An alternative to using strain sensors whose sensitivity scales with the maximum strain in the instrument is to use a displacement sensor whose sensitivity scales with maximum displacement. A displacement sensor yields a strain measurement by dividing the displacement by the length of the sensor. Thus, if the strains of interest are limited in magnitude, a displacement sensor of sufficient length could be used in lieu of a strain sensor. A device using displacement sensors may tend to require longer measurement paths than an equivalently sensitive instrument employing strain sensors. Typically components of interest are extricated through a balanced bridge of sensors. One difficulty in increasing the measurement length, especially in a multi-component instrument, is that the separation of these components is usually based on an approximation of constant strain over a small region. Designing a transducer based on this approximation that utilizes displacement sensors and increases the measurement length would tend to exacerbate the cross-talk between the component measurements. There are numerous methods to measure the properties of a deforming body. A typical laser fiber optic interferometric strain gauge is taught by Butter in U.S. Pat. No. 4,191,470. Moire interferometers have also been used to determine structure deformation, as can be seen in Dason, U.S. Pat. No. 4,850,693. None of the prior art, however, successfully addresses the limitations above discussed. The invention disclosed overcomes these limitations.

Load transducers are described that, within the confines of elastostatics, have zero cross-talk amongst the resultant component measurements. A six-component load transducer can be constructed using either electrical or optical sensors of finite measurement path length. The electrical strain gauges can have zigzagging paths and still retain the component separation. The Mach-Zehnder optical sensors allow an instrument in which the signal (i.e. total phase change) at maximum load grows with the geometry. For a fixed maximum load and signal measurement capability this geometric scaling corresponds to an increase in the precision of the load measurement.

An improved torsion transducer is also disclosed in which the precision of the device scales with the number of paths, while the number connections to the instrument remains constant. From this design, a "solid" torsion transducer is presented for which the fiber optic paths are the entire load bearing portion of the instrument. In a further embodiment, a linear acceleration sensor and a structural integrity sensor that is invariant to all end loading are disclosed.

An important consequence of the fiber-optic geometric scaling is that the optical instruments can have lower material design strains than electrical transducers. This lower strain allows the actual instrument to be a direct load bearing structure. Another consequence of this geometric scaling is that the load instrument need not be constructed of structurally efficient materials. For instance, for a constant load and design strain, a lower modulus construction material would result in a bigger geometry. This larger geometry corresponds to a longer fiber-optic sensor path and thus a larger signal.

BRIEF DESCRIPTION OF THE DRAWINGS

FIG. 9A is a perspective view of a linear acceleration transducer incorporating the invention, while

DETAILED DESCRIPTION OF THE PREFERRED EMBODIMENT

Figure 1A:
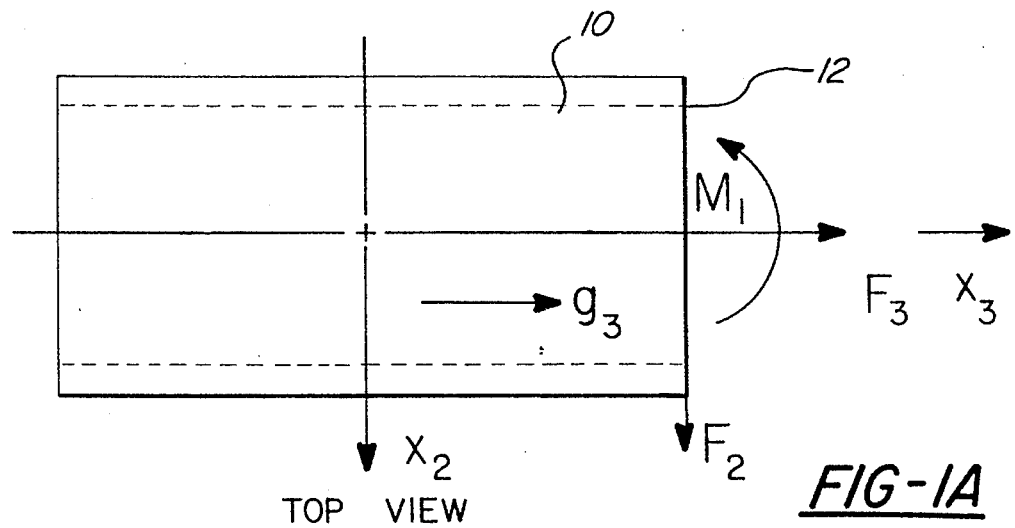
FIGS. 1A, 1B and 1C are a schematic view of a sample structure suitable for incorporating displacement sensors, and providing the necessary geometric reference for a full understanding of the basic formulas disclosed herein.
Figure 1B:
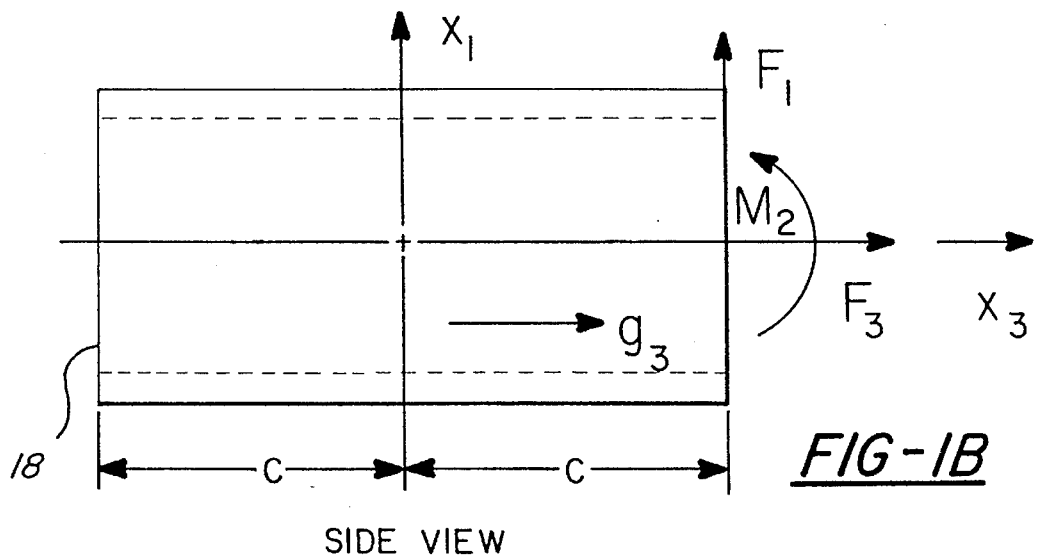
Figure 1C:
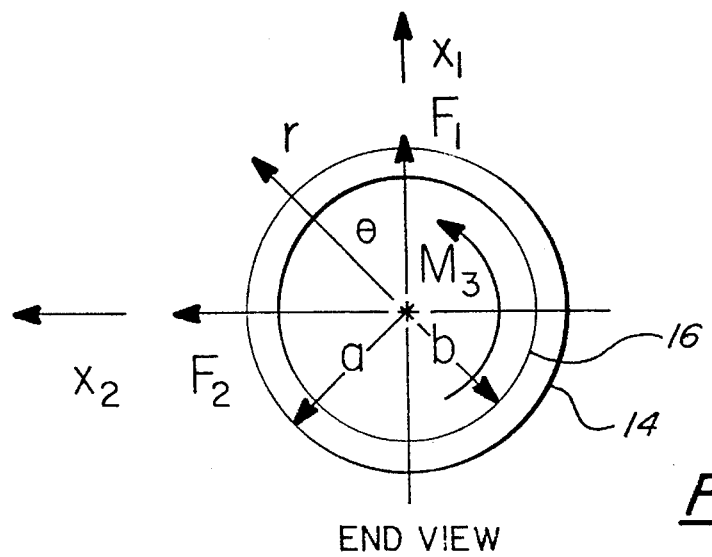

There are several exact solutions of finite regions with arbitrary loads in three dimensional elasticity. Referring to FIGS. 1A, 1B, and 1C a prismatic tube with a circular section was chosen for this investigation for the simple reason that under pure torsion the cross-section does not warp. A hollow tube is employed to give some flexibility in scaling the geometry.

A prismatic circular tube 10 of outside radius "a", inside radius "b", and half length "c" is shown in FIGS. 1A, 1B, and 1C. The axis of the cylinder is aligned with the $x_3$ direction of a Cartesian coordinate system $(x_1,x_2,x_3)$. For convenience a typical clindrical coordinate system $(r,\theta,x_3)$ is also defined.

The cylinder 10 is assumed to be in static equilibrium. The positive face 12 of the cylinder 10, at $x_3=c$, is loaded by arbitrary surface tractions. The lateral surfaces 14 and 16, (r=a and r=b) are not loaded. The cylinder 10 is further loaded by a constant gravitational acceleration, $g_3$, in the $x_3$ direction, and strained by a uniform change in temperature $\Delta T$, measured from ambient. The negative face 18 of the cylinder, at $x_3=-c$, has the surface tractions necessary to maintain static equilibrium.

Integrating the arbitrary surface tractions on the positive face of the cylinder yields the resultant or statically equivalent loads. The three resultant force components due to the applied surface tractions on the $x_3=c$ face are denoted by $F_i$ where "i" (i=1,2,3) indicates the component direction. The three resultant moment components on the same face are similarly denoted by $M_i$, assuming the moment is positive in the direction of the Cartesian coordinate system using a right hand rule.

The cylinder 10 is assumed to be composed of an isotropic, homogeneous, linear elastic material. E denotes Young's Modulus, $\upsilon$ the Poisson Ratio, $\rho$ the density, and $\alpha$ the coefficient of thermal expansion of the material. This problem can be made non-dimensional as given in equation 1. Equation 2 defines the non-dimensional versions of the cross-sectional area, moment of inertia, torsional constant, the shear modulus and other convenient quantities (equations 1 and 2).

$$\hat{a}=1 \quad \hat{b}=\frac{b}{a} \quad \hat{c}=\frac{c}{a} \quad \hat{x}_i=\frac{x_i}{a} \qquad (EQ\ 1)$$

$$\hat{F}_i\frac{F_i}{Ea^2} \quad \hat{g}_3=\frac{a\rho g_3}{E} \quad \hat{M}_i=\frac{M_i}{Ea^3} \quad \hat{T}=\alpha\Delta T$$

$$\hat{A}=\pi(1-\hat{b}^2) \quad \hat{I}=\frac{\pi}{4}(1-\hat{b}^4) \quad v_1=v+\frac{1}{2} \quad \hat{r}^2=\hat{x}_1^2+\hat{x}_2^2 \qquad (EQ\ 2)$$

$$\hat{J}=\frac{\pi}{2}(1-\hat{b}^4) \quad \hat{G}=\frac{1}{2(1+v)} \quad v_2=\frac{3}{4}+\frac{v}{2} \quad v_3=v+\frac{2}{3}$$

If the applied surface tractions correspond in magnitude and distribution to these stresses, the solution is exact everywhere. However, if the tractions are arbitrary this solution is valid only in the Saint Venant sense. That is, far from the cylinder faces 12 and 18 the solution for arbitrary end loads exponentially approaches this answer. Therefore, this solution can be considered exact to some precision for arbitrary end loading as long as it is used some distance from the cylinder faces.

An electrical resistance strain gauge measures strain by determining the change in resistance from its initial state. To determine this small change in resistance and to account for some false signals such as temperature induced strain, the resistance is typically found through a voltage measurement of a balanced resistance bridge circuit. For two strain gauges that are identical except for location of placement, the measured change in voltage can be written as in equation 3. Here $\bar{\epsilon}$ is the average strain seen by each measurement path.

$$\hat{V}_\Delta(\bar{\epsilon}_1,\bar{\epsilon}_2)=S_w(\bar{\epsilon}_1-\bar{\epsilon}_2) \qquad (EQ\ 3)$$

Figure 4B:
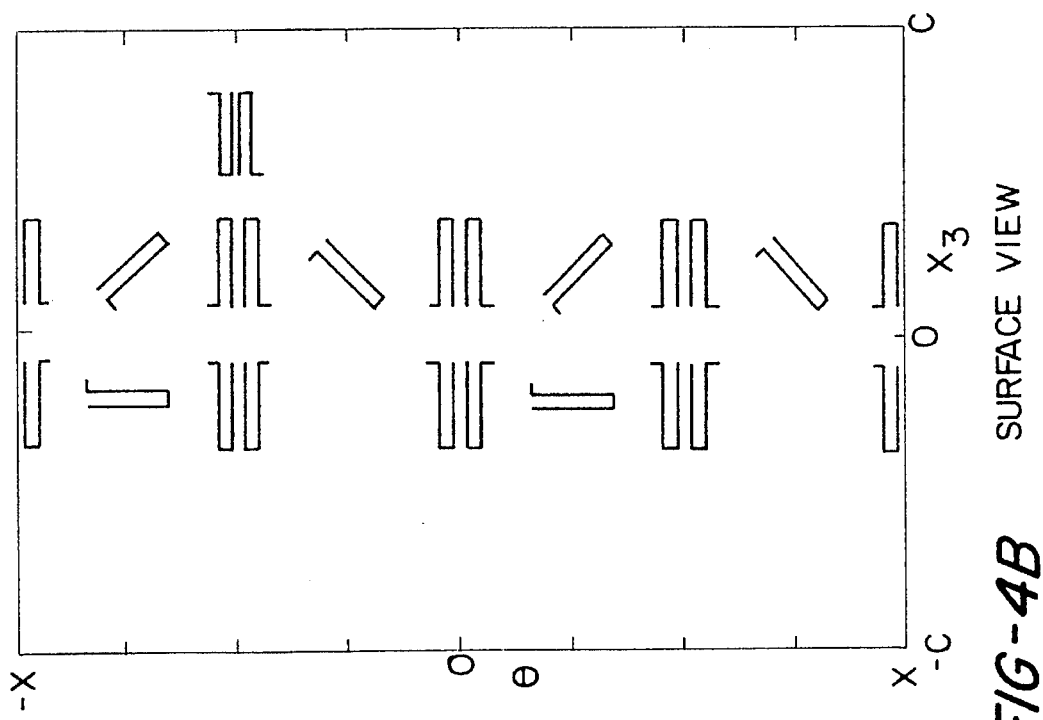
FIGS. 4A and 4B represent a schematic view, in three dimensions and in surface view, of the layout of sensor paths on the outside of a cylinder surface, and one embodiment of the invention incorporating electrical resistance measurement.
Figure 4A:
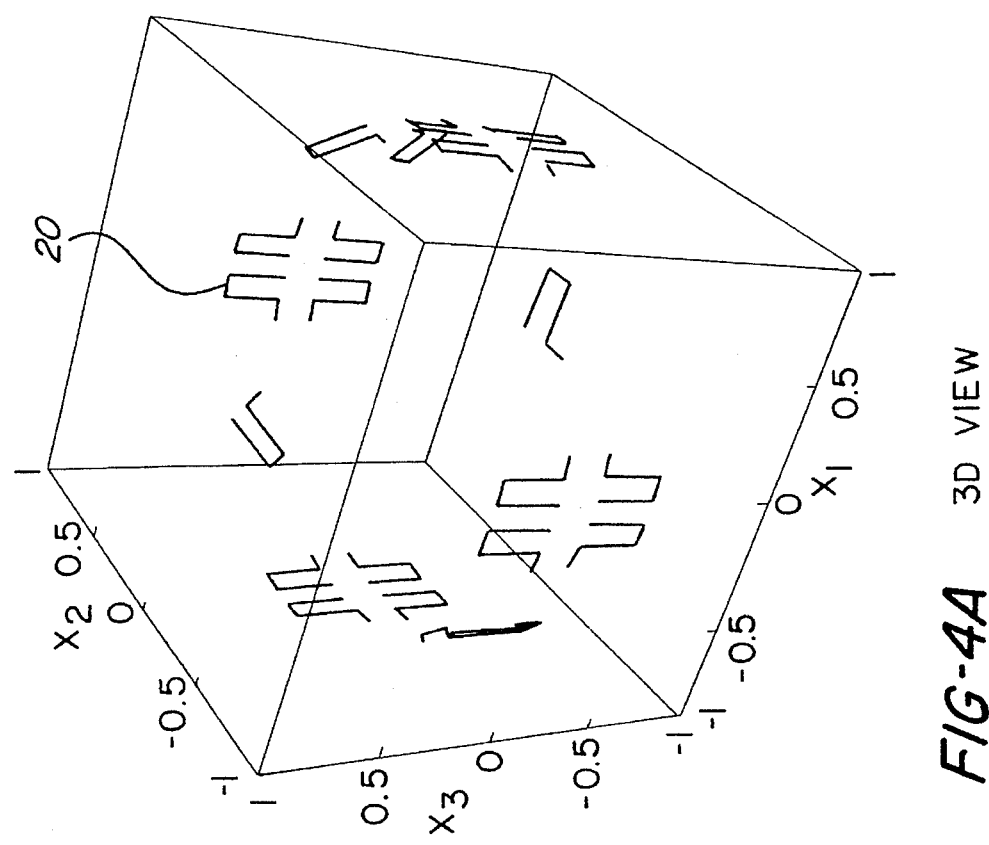

Part of the versatility of an electrical resistance technique is that the gauge path can be quite general. Zigzagging paths 20, as shown in FIGS. 4A and 4B, are frequently employed to increase the sensor length in a small neighborhood on the device. Varying the cross-sectional area allows the region of greatest sensitivity to be localized to the area of maximum strain.

The sensitivity of this electrical technique for a given maximum strain, can be augmented by increasing both the bridge excitation voltage and the strain sensitivity $S_w$. Unfortunately both of these parameters have restrictions. The bridge excitation voltage is limited by several factors, such as heat dissipation or common mode isolation. The strain sensitivity is a material property and is thus limited by known materials.

An alternative to the above resistive technique is a measurement based on optical wave guides. A fiber can be used to measure displacements or other phenomenon by various means. One such displacement measuring method is to configure two fibers in the form of a Mach-Zehnder interferometer to make a "fiber optic strain gauge". The change in phase of the light between two axially strained fibers is given in equation 4.

$$\psi_\Delta=S_p\hat{d}(\bar{\epsilon}_1-\bar{\epsilon}_2) \qquad (EQ\ 4)$$

$\bar{\epsilon}$ again the average strain seen by each measurement path and $\hat{d}$ is the fiber half-length. The phase sensitivity of the fiber-optic measurement, $S_p$, is dependent on the material properties of the fiber and the wavelength of light being employed. For the present purposes this sensitivity is taken as a given parameter and is good to first order in strain. The sensitivity of this technique can be increased by using a short wavelength of light. At the same time this particular fiber-optic method has a geometric property the resistive technique lacks. Namely, for a fixed change in phase as the measurement path is increased the strain sensitivity will also increase.

Unfortunately, this scaling of the strain sensitivity with the distance has a price. These fibers have other limitations that are not found in their electrical cousins. In particular, fibers in general have very restrictive path requirements (e.g. minimum radii of curvature limitation) to maintain light in the wave guide. Consequently, the zigzagging paths (paths that are for practical purposes discontinuous in the first derivative of position with respect to the path length) are not allowed. In addition this interferometric sensor is not a state device. The sensor can only detect a relative change in phase. That is, the interferometric output beyond a single fringe is not one-to-one invertible to the strain. External means such as counters or phase trackers are required in order to integrate the change in phase.

Even with the restriction to a simple geometry and to the designated types of sensors there are innumerable choices for the measurement paths. It is conceivable that the paths can traverse any part of the cylinder. Again for the sake of simplicity, the measurement paths will initially be assumed to be restricted to the cylinder surface. Clearly the sensors need to be located away from the cylinder faces, to allow the arbitrary end loading to approach the exact solution. Also the paths will be further restricted to the outside lateral surface (i.e. $\hat{r}=1$) for guaranteed accessibility.

Two families of paths are used to separate the load components. In the case of fiber-optic sensors they provide for a potential increase in measurement precision. The chief attribute of these paths is that they are reasonably easy to integrate for the average strain. The helixes can be used almost exclusively except for some of the fiber-optic cases.

A third family of paths is provided to connect sensing paths in a smooth yet geometrically simple manner.

Figure 2:
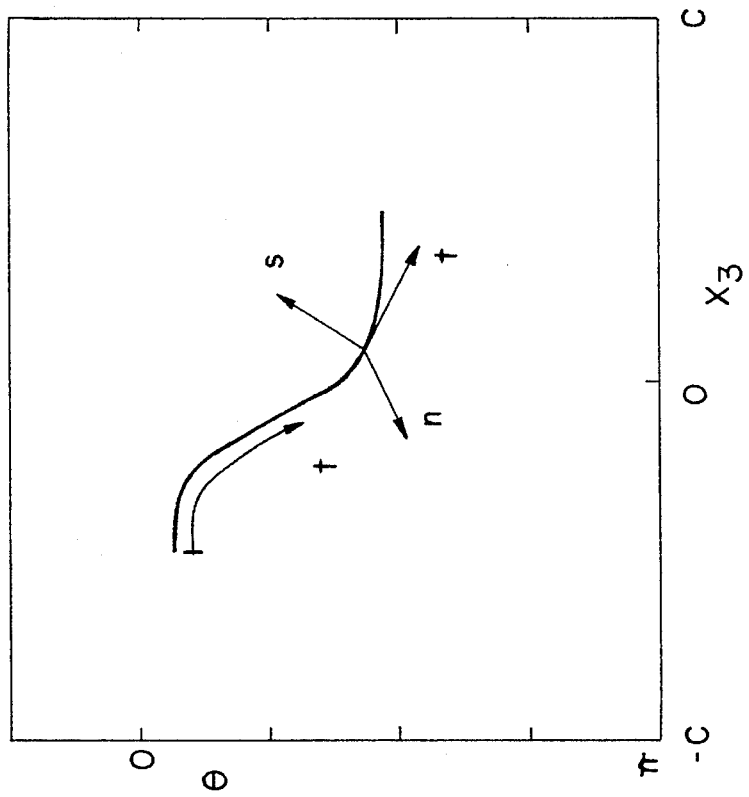
FIG. 2 is a two-dimensional representation of the surface of the cylinder of FIGS. 1A, 1B, and 1C showing the direction vectors in an arbitrary measurement path.

A measurement path on the surface of the cylinder can be parameterized in terms of the cartesian components of its position vector $\hat{P}_i(s)$ (i=1,2,3). The components of the vector tangent to the path, t as shown in FIG. 2, can then be calculated. The vector normal to the path, s, and a vector normal to the surface of the cylinder, n, are also shown. The average strain seen by the path is given by equation 5 where $C_{11}$, $C_{12}$, and $C_{22}$ are the normal, shear, and transverse weighting coefficients respectively; $\epsilon_{ii}$ is a component of the Cartesian strain tensor; and d is the non-dimensional length of the path. Typically for a bonded wire strain gauge the coefficients $C_{12}$ and $C_{22}$ are at least an order of magnitude less than $C_{11}$ therefore they will be neglected in the average strain definitions. For simplicity, $C_{11}$ will be defined to be 1 corresponding to a perfect bond between the cylinder and gauge.

$$\bar{\epsilon} = \frac{1}{d} \sum_{i=1}^{3} \sum_{j=1}^{3} \int_0^d (C_{11}\epsilon_{ij}t_it_j + C_{12}\epsilon_{ij}t_is_j + C_{22}\epsilon_{ij}s_is_j)dt \quad \text{(EQ 5)}$$

Figure 3:
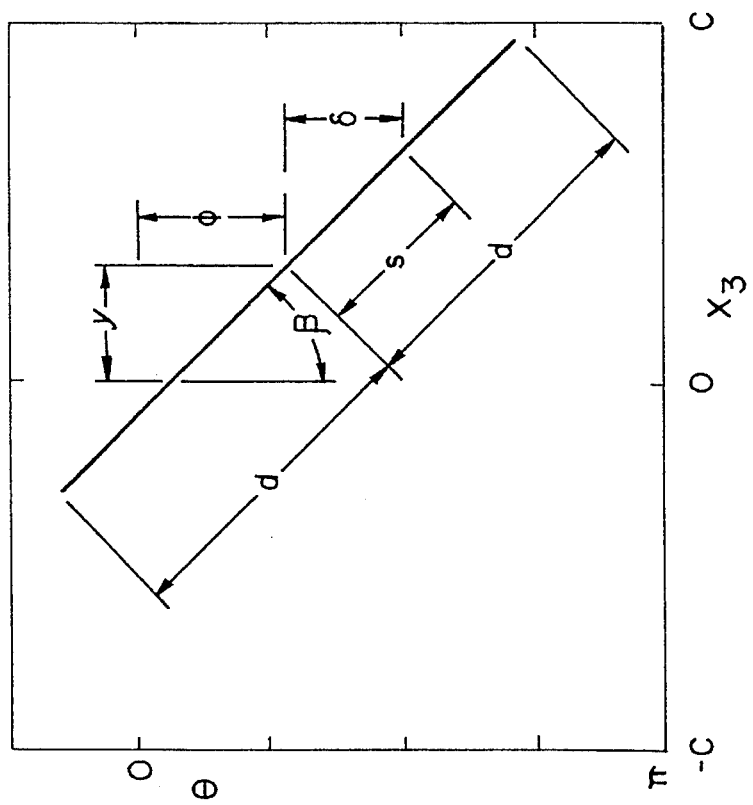
FIG. 3 is a two-dimensional representation of the surface of the cylinder, containing a schematic of the terms used to locate a measurement path on the outside lateral surface of the cylinder.

As shown in FIG. 3, a family of symetric helicoids on the surface of the cylinder are parameterized in terms of the angle δ as in equation 6. The term $\hat{y}$ gives the location of the center of the path in the 3-direction. The term φ indicates the angular position of the center of the measurement path in the plane of the cross-section. The symbol β represents the angle of the helix.

$$\hat{p}_1(\delta,\phi) = \cos(\delta + \phi) \quad \hat{p}_3(\delta,\hat{y},\beta) = \hat{y} + \tan(\beta)\delta \quad \text{(EQ 6)}$$
$$\hat{p}_2(\delta,\phi) = \sin(\delta + \phi)$$

The half-length of the path is $d_h$ is given by the subtended angle represented by equation 7. Integrating the strain components along the helix yields the average strain for the helical path given in equation 8; $\upsilon_3$ and $\upsilon_4$ are convenient path constants defined in equation 9.

$$\delta_h = \cos(\beta)\hat{d}_h \quad \text{(EQ 7)}$$

$$\bar{\epsilon}_h(\hat{d}_h,\phi,\hat{y},\beta) = \hat{T} + \upsilon_3 \left[ \frac{\hat{F}_3}{A} + \hat{g}_3(\hat{c}-\hat{y}) \right] + \frac{\hat{M}_3\sin(\beta)}{GJ\sec(\beta)} +$$

$$\frac{\upsilon_3}{I} \left\{ [\hat{F}_2\upsilon_4 - \hat{M}_2 - \hat{F}_1(\hat{c}-\hat{y})]\frac{\sin(\delta_h)}{\delta_h} - \hat{F}_2\frac{\cos(\delta_h)}{\cot(\beta)} \right\} \cos(\phi) -$$

$$\frac{\upsilon_3}{I} \left\{ [\hat{F}_1\upsilon_4 - \hat{M}_1 + \hat{F}_2(\hat{c}-\hat{y})]\frac{\sin(\delta_h)}{\delta_h} - \hat{F}_1\frac{\cos(\delta_h)}{\cot(\beta)} \right\} \sin(\phi) -$$

$$\upsilon_3 = \frac{\tan(\beta)^2 - \nu}{\tan(\beta)^2 + 1} \quad \upsilon_4 = \tan(\beta) \left[ 1 + \frac{(\upsilon_1 + 2\upsilon_2\hat{b}^2)}{(\tan(\beta)^2 - \nu)} \right] \quad \text{(EQ 9)}$$

The second family of measurement paths are ellipses. The ellipses are parameterized in terms analogous with the helix, as shown in equation 10.

$$\hat{p}_1(\delta,\phi) = \cos(\delta + \phi) \quad \hat{p}_3(\delta,\phi,\hat{y},\beta) = \hat{y} + \tan(\beta)\sin(\delta) \quad \text{(EQ 10)}$$
$$\hat{p}_2(\delta,\phi) = \sin(\delta + \phi)$$

The elliptical path can be considered to be formed from the intersection of a plane with the outside cylindrical surface of the tube. β is the angle between the normal of this plane and the $x_3$ direction. The half-length of the path $\hat{d}_e$ is given by the subtended angle $\xi_e$ as represented by equation 27. The average strain for the elliptical paths, which has a dependence similar to the helical paths on the loading $\hat{F}_i, \hat{M}_i, \hat{g}_3$, is defined in the following equations:

$$\hat{d}_e = \sqrt{1 + \bar{\beta}_e^2} \; E\left(\delta_e, \frac{\bar{\beta}_e}{\sqrt{1 + \bar{\beta}_e^2}}\right) \quad \text{(EQ 27)}$$

$$\bar{\epsilon}_e(\hat{d}_e,\phi,\hat{y},\beta) = \hat{T} + \frac{\hat{M}_3}{\hat{d}_e GJ} as(\delta_e,\bar{\beta}_e) + \frac{1}{\hat{d}_e}\left[\frac{\hat{F}_3}{A} + \hat{g}_3(\hat{c}-\hat{y})\right] \times \quad \text{(EQ 30)}$$

$$\left[\frac{\bar{\beta}_e\sin(\delta_e)\cos(\delta_e)}{\sqrt{1 + \bar{\beta}_e^2\cos(\delta_e)^2}} - \frac{\nu}{\sqrt{1 + \bar{\beta}_e^2}} \; F\left(\delta_e, \frac{\bar{\beta}_e}{\sqrt{1 + \bar{\beta}_e^2}}\right)\right] +$$

$$\frac{1}{\hat{d}_e}\left\{[\hat{M}_2 + \hat{F}_1(\hat{c}-\hat{y})]\frac{\cos(\phi)}{I} + [-\hat{M}_1 + \hat{F}_2(\hat{c}-\hat{y})]\frac{\sin(\phi)}{I}\right\} \times$$

$$\left\{\left[\frac{2\nu + 1 - \bar{\beta}_e^2}{2\bar{\beta}_e}\right] as(\delta_e,\bar{\beta}_e) - \frac{\sin(\delta_e)\sqrt{1 + \bar{\beta}_e^2\cos(\delta_e)^2}}{2}\right\} +$$

$$\frac{1}{\hat{d}_e}\left[\hat{F}_2\frac{\cos(\phi)}{I} - \hat{F}_1\frac{\sin(\phi)}{I}\right] \bar{\beta}_e\sin(\delta_e)\cos(\delta_e) \times$$

$$\left[\frac{\upsilon_1 + 2\upsilon_2\hat{b}^2 + \nu + \frac{(2 + \bar{\beta}_e^2)}{3}}{\sqrt{1 + \bar{\beta}_e^2\cos(\delta_e)^2}} - \frac{1}{3}\sqrt{1 + \bar{\beta}_e^2\cos(\delta_e)^2}\right]$$

$$E(\phi,k) \equiv \int_0^\phi \sqrt{1 - k^2\sin(\alpha)^2} \; d\alpha \quad \text{(EQ 28)}$$

The function F (φ,k) is the normal elliptic integral of the first kind, E (φ,k) is the normal elliptic integral of the second kind, and the function "as(φ,α)" is defined in equation 29.

$$F(\phi,k) \equiv \int_0^\phi \frac{d\alpha}{\sqrt{1 - k^2\sin(\alpha)^2}} \quad \text{(EQ 29)}$$

$$as(\phi,\alpha) \equiv a\sin\left(\frac{\alpha \times \sin(\phi)}{\sqrt{1 + \alpha^2}}\right)$$

Finally, the intersection of a second smaller cylinder with the surface of the original cylinder at a right angle yields a third family of measurement paths. These circular paths are parameterized by equation (11) where $r_2$ is the non-dimensional radius of the second cylinder ($\hat{r}_2 \leq 1$) and δ,$\hat{y}$, and φ are as defined for the helical path. However, in contrast to the previous paths, the circular path is parameterized in terms of the angle ψ. The average strain for the circular path is currently only known in terms of integrals.

$$\hat{p}_1 = \cos(\delta + \phi)$$

$$\hat{p}_2 = \sin(\delta + \phi)$$

$$\hat{p}_3 = \hat{r}_2 \sin\psi + \hat{y}$$

$$\delta = a\sin(\hat{r}_2 \cos\psi) \quad \text{(EQ 11)}$$

Since the average strain components of the circular paths currently do not have a relatively simple dependence on the resultant loads, as compared to the helical and elliptical paths, these circular paths will be used for connecting paths, rather than as sensing paths.

ELECTRICAL EMBODIMENT

Motivated by equation 3, the voltage measurement in terms of the strain along a helix can be written as in equation 12. The half-length of all the sensors are chosen to be constant and denoted by $\hat{d}_h$. The center position and helical angle can be varied to provide different sensitivities to the six load components. The primed and double primed symbols are merely dummy variables to define the function.

$$\hat{V}_\Delta(\psi',\phi',\hat{y}',\beta',\psi'',\phi'',\hat{y}'',\beta'')=$$
$$S_b S_g [\bar{\epsilon}_h(\hat{d}_h,\psi''+\phi'',\hat{y}'',\beta'') - \bar{\epsilon}_h(\hat{d}_h,\psi''+\phi'',\hat{y}'',\beta'')] \quad (EQ\ 12)$$

An example of combinations of signals using symetric helical paths to give the resultant force and moment components on the face of cylinder are shown in FIGS. 4A and 4B. The paths 20 are chosen such that they do not cross and stay near the central area of the cylinder. The requirement that the sensors do not cross is to avoid having to address this problem in a future error analysis. The end result of this procedure are the signal coefficients $C'_{wi}$, (i=1,2, . . . ,6) which will determine the precision of the resultant load measurement for a given sensor arrangement. A signal coefficient is a proportionality constant between a set of voltage measurements and the resultant (force or moment) components, i.e., component $\alpha$ (signal coefficient) (voltage measurement). The coefficients for these components are given in equation 34.

$$C'_{g1} = \frac{\hat{I}}{8 S_b S_g \hat{y}_1 \cos(\phi_1)} \quad (EQ\ 34)$$

$$C'_{g2} = \frac{\hat{A}}{2 S_b S_g (1+v)}$$

$$C'_{g3} = \frac{\hat{A}(\hat{y}_1 + \hat{c})}{4 S_b S_g \hat{y}_1}$$

$$C'_{g4} = (\hat{y}_1 + \hat{c}) C'_{g1}$$

$$C'_{g5} = (\hat{y}_1 - \hat{c}) C'_{g1}$$

$$C'_{g6} = \frac{\hat{G}\hat{J}}{4 S_b S_g \cos(\beta)\sin(\beta)}$$

A half-bridge circuit uses inputs from sensor paths in pairs. Here the pairs of paths are typically separated by an angle of $\pi$. This separation allows the trigonometric terms in the average strain to change sign and permit the subsequent additive operations to yield the results of interest. Further, to keep the presentation brief some sensors are utilized repeatedly. For instance the sensors that are used to find $\hat{F}_1$ are exploited again in a different combination to find $\hat{M}_2$.

It is difficult to discuss the signal coefficients given in equation 34 in detail without specifying the magnitudes if the components to be measured and the subsequent sizing of the cylinder. However, certain general observations can be made. The measurement exactly separates the resultant load components. In other words the signal coefficients $C'_{wi}k$, (i=1,2, . . . ,6) are independent of the load components. Also, as expected, the measurements are independent of the length of the strain gauge. That is, the signal coefficients do not depend on $\hat{d}_h$.

It turns out that even with the zigzagging paths 20 shown in FIGS. 4A and 4B, and even if equation 3 is modified to include a cross-sensitivity (i.e. $C_{22} \neq 0$), the load components are still separable. For the sensor with cross sensitivity (i.e. a foil type strain gauge rather than a bonded wire gauge) the net effect on the coefficients in equation 34 is that in most cases $S_w$ simply needs to be modified. The zigzagging paths greatly complicate the coefficients while retaining the aforementioned favorable qualities.

OPTICAL EMBODIMENT

Motivated by equation 4 the phase, $\psi_\Delta$, is given in terms of the average strain of the helical paths as seen in equation 14. It is again assumed, for the sake of this description, that all the measurement paths have the same half-length $\hat{d}_h$. Analogous with the half-bridge measurement of the strain gauges, the change in phase is determined between two fibers.

$$\psi_\Delta(\phi',\hat{y}',\beta',\phi'',\hat{y}'',\beta'')=$$
$$2 S_f \hat{d}_h [\bar{\epsilon}_h(\hat{d}_h,\phi',\hat{y}',\beta') - \bar{\epsilon}_h(\hat{d}_h,\phi'',\hat{y}'',\beta'')] \quad (EQ\ 14)$$

Figure 5B:
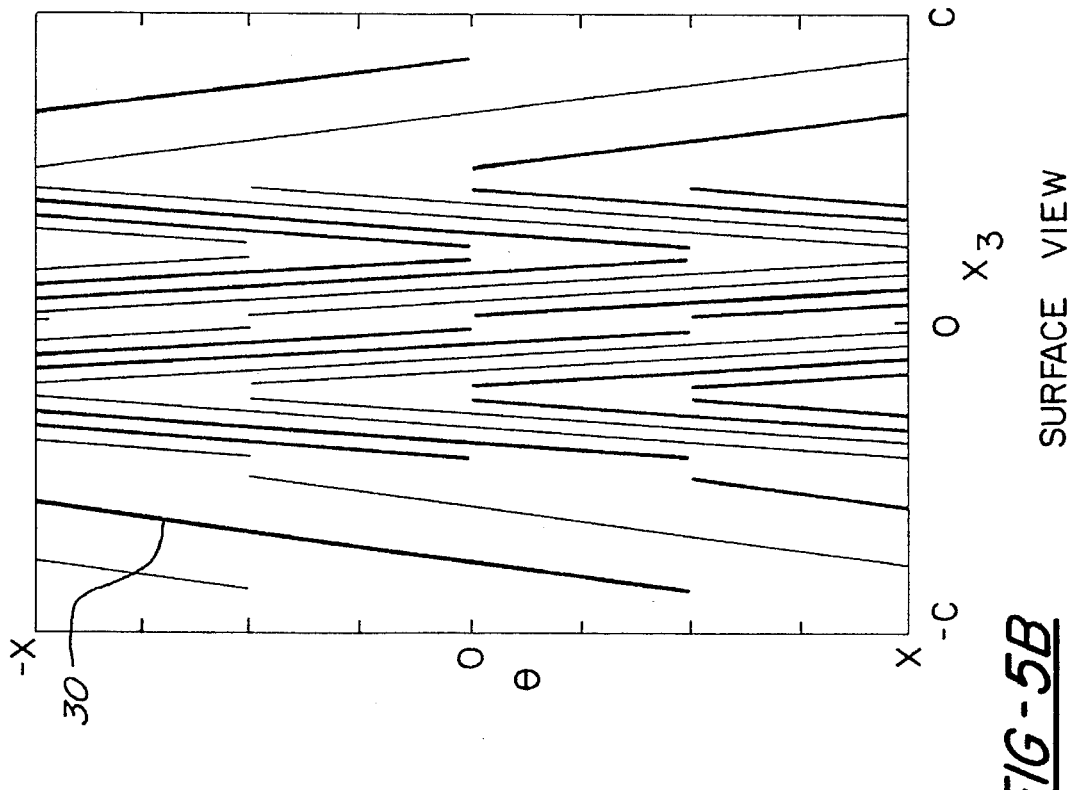
FIGS. 5A and 5B represent a schematic in three dimensional and surface views of the layout of helical fiber optic paths on the outside of a cylinder surface.
Figure 5A:
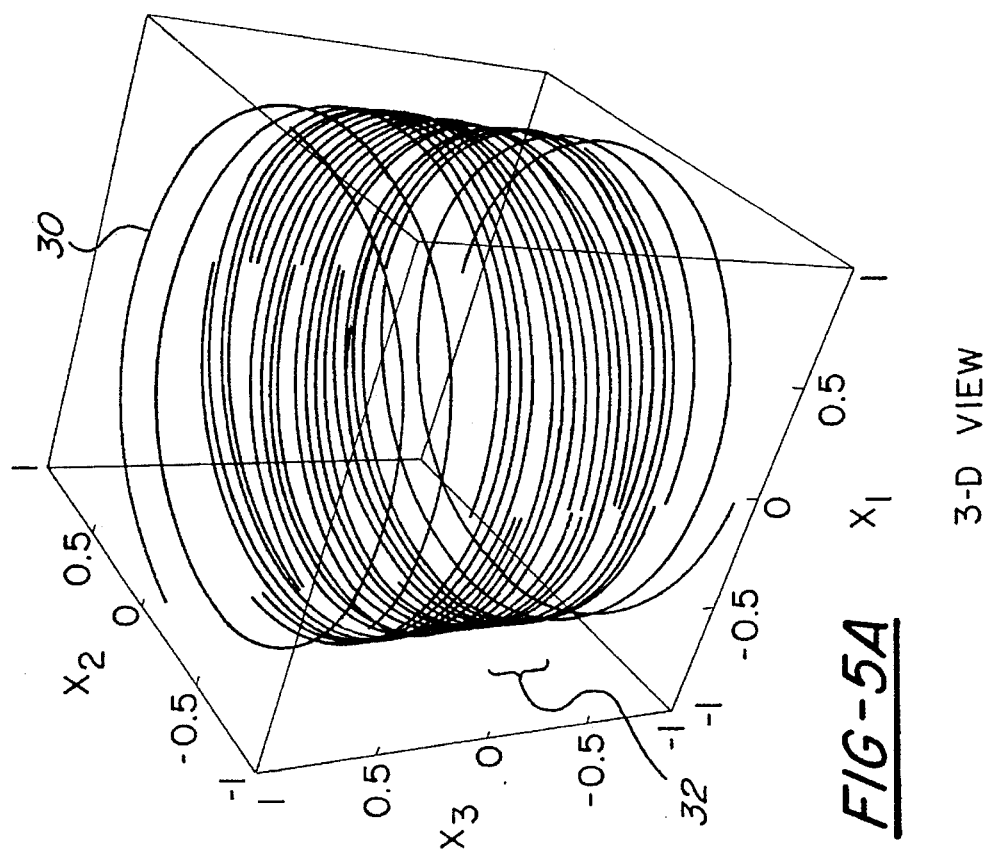

An example of signals using fiber-optic sensors 30 and helical paths 32 is shown in FIGS. 5A and 5B. For comparison, the signal coefficients for each of the components are given in equation 43.

As with the electrical strain gauges, these signal combinations yield independent measurements of each of the load components. That is, each of the coefficients do not depend on the load components leading to zero theoretical crosstalk. Unlike the electrical case, the coefficients have a length parameter $\hat{d}_h$ in the denominator. This dependence allows the length of the sensor elements used to vary the magnitude of the signal coefficients and thus the sensitivity of the measurement. In other words, for a fixed geometry and a fixed minimum phase, smaller load components can be measured if there is room on the cylinder surface to increase the sensor length.

$$C'_{f1} = \frac{\frac{\hat{I}}{16}(\bar{\beta}_1^2 + 1)}{\bar{\beta}_1 \hat{d}_h S_f \left[ \cos(\delta_{h1})(v - \bar{\beta}_1^2) + \frac{\sin(\delta_{h1})}{\delta_{h1}} \left( \frac{1}{2} + \bar{\beta}_1^2 + 2 v_2 \hat{b}^2 \right) \right]} \quad (EQ\ 43)$$

$$C'_{f2} = \frac{\hat{A}(\bar{\beta}_1^2 + 1)(\bar{\beta}_2^2 + 1)}{8 \hat{d}_h S_f (1+v)(\bar{\beta}_1^2 - \bar{\beta}_2^2)}$$

$$C'_{f3} = \frac{\hat{A}(\bar{\beta}_1 + 1)}{16 \hat{d}_h S_f} \left[ \frac{2\hat{c}}{(\hat{y}_2 - \hat{y}_1)(v - \bar{\beta}_1^2)} + \frac{(\bar{\beta}_2^2 + 1)}{(1+v)(\bar{\beta}_2^2 - \bar{\beta}_1^2)} \right]$$

$$C'_{f4} = \frac{\hat{I}(\hat{y}_1 + 2\hat{c} - \hat{y}_2)}{16 \hat{y}_1 S_f (v - \bar{\beta}_1^2)\sin(\delta_{h1})\cos(\beta_1)}$$

$$C'_{f5} = \frac{\hat{I}(\hat{y}_1 - 2\hat{c} - \hat{y}_2)}{16 S_f (v - \bar{\beta}_1^2)(\hat{y}_2 - \hat{y}_1)\sin(\delta_{h1})\cos(\beta_1)}$$

$$C'_{f6} = \frac{\hat{G}\hat{J}}{16 \hat{d}_h S_f \cos(\beta_1)\sin(\beta_1)}$$

The fiber-optic signal coefficients, excluding the two bending moment measurements and the two shear measurements, can in principle be made arbitrarily small by increasing the sensor length. The bending moment and shear measurements using helical paths effectively loose the length parameter in the denominator.

Figure 6B:
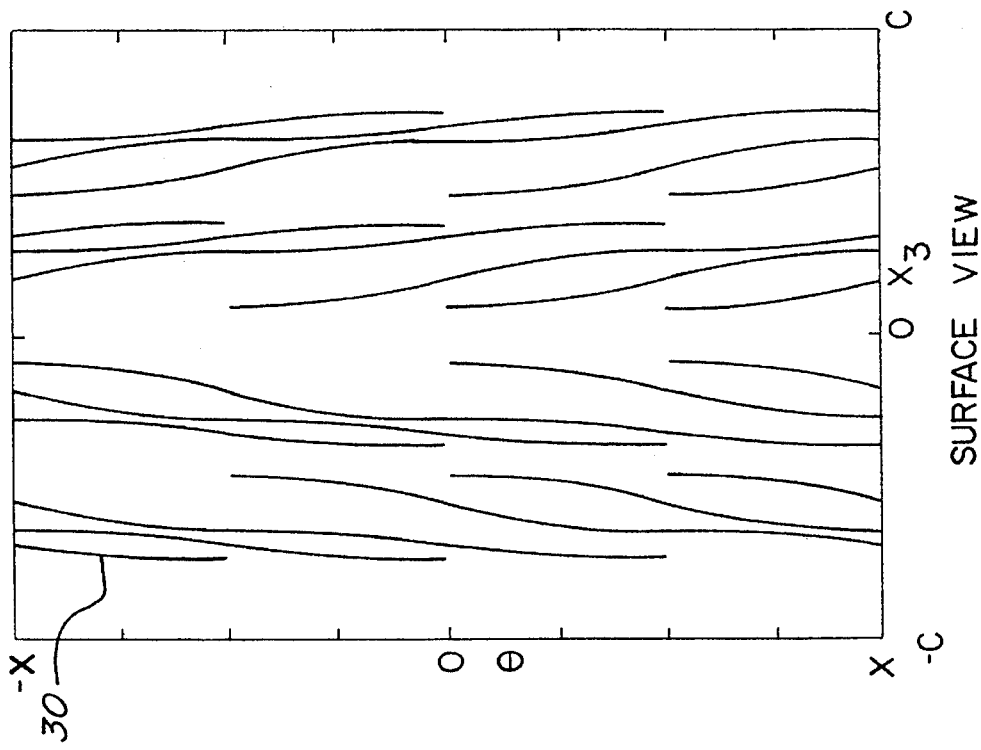
FIGS. 6A and 6B represent a schematic in three dimensional and surface view of the layout of substitute half-eliptical fiber optic paths on the outside of a cylinder surface.
Figure 6A:
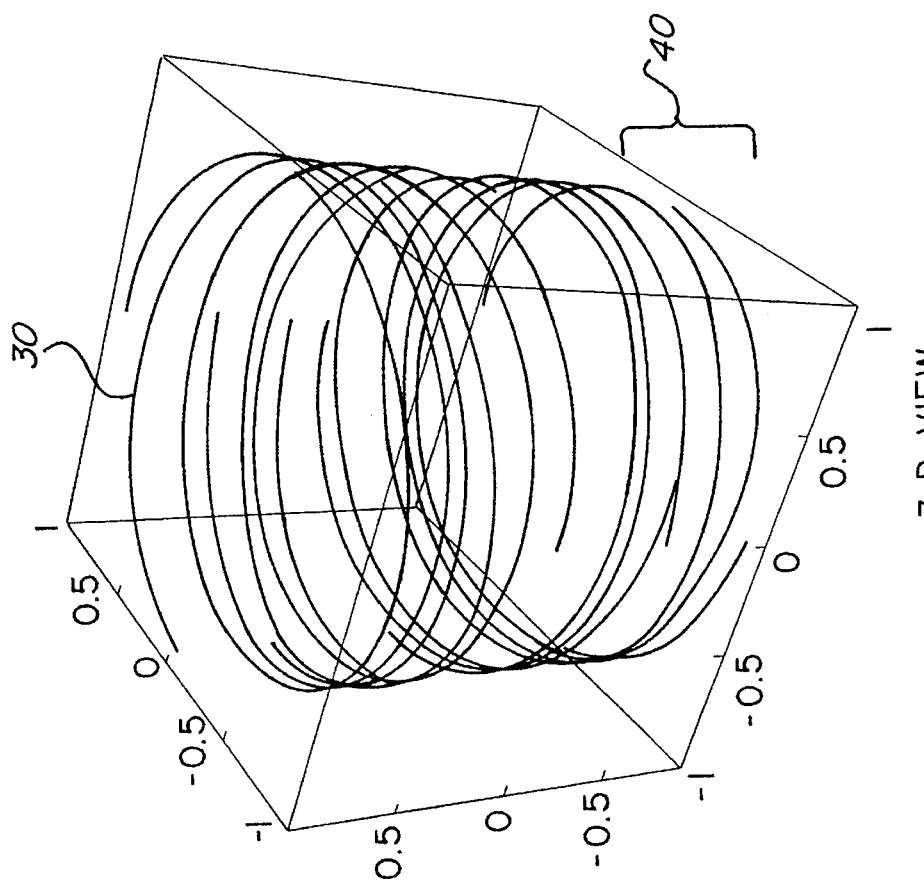

An alternative approach using fiber-optic sensors 30 and a sequence of half-elliptical paths 40 to determine the shear load components and the bending moment load components is shown in FIGS. 6A and 6B. The solution for the new shear force and bending moment signal coefficient is given in equation 31 where m is the number of sets of elliptical paths.

These new coefficients now have the length parameter, m, in the denominator. This puts the bending moment and shear coefficients on equal footing with the other helical path coefficients. In addition, if space permits, the sensitivity of the fiber to transverse strains could also be included. As with the electrical sensors these optical measurements would retain their separability and scaling with only a change to $S_f$.

$$C_{f1}^{II} = \frac{\hat{I}}{8mS_f(y_1 - y_2)[g(\beta_2) - g(\beta_1)]} \quad (31)$$

$$C_{f4}^{II} = \frac{\hat{I}(\hat{y}_1 - \hat{y}_2 + 2\hat{c})}{16mS_f(\hat{y}_1 - \hat{y}_2)[g(\beta_2) - g(\beta_1)]}$$

$$C_{f5}^{II} = \frac{\hat{I}(\hat{y}_2 - \hat{y}_1 + 2\hat{c})}{16mS_f(\hat{y}_1 - \hat{y}_2)[g(\beta_1) - g(\beta_2)]}$$

$$g(\beta) = \cos(\beta)\sin\left(\frac{\pi}{2}\cos(\beta)\right)[\nu - \tan^2(\beta)]$$

ADVANCED APPLICATION

Figure 11:
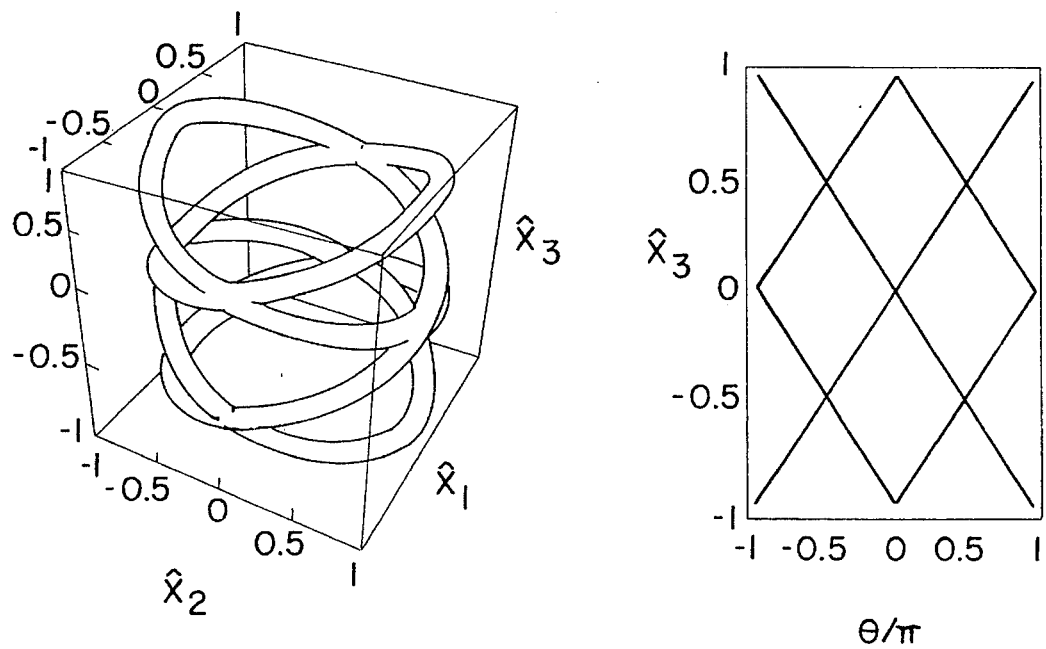
FIG. 11 is a schematic view, in perspective and two dimensions, of the layout of an embodiment of the invention using multiple sets of paths.

One way to increase the signal, thus improving the precision of the transducer, is to utilize the scaling property of the fiber optic differential displacement gauge by increasing the number of paths on the surface of the cylinder. FIG. 11 shows a torsion transducer 52 using six sets 50 of four helical paths. Each set of paths is a complete sensor, only sensitive to the twisting moment.

The collective torsion sensor yields a signal proportional to the length of the path as given by equation 17 where k is the number of sets. Notice that, for a given measurement resolution of $\psi_A$, as k becomes large the precision of $M_3$ is increased. In addition, the torsion sensor retains its invariance to all other loading when the transverse weighting coefficient (i.e. $C_{22} \neq 0$) included in the average strain formulation of the paths.

$$\phi_A = \frac{16k\hat{d}_h S_f \cos\beta \sin\beta}{GJ} \hat{M}_3 \quad (EQ\ 17)$$

Figure 7A:
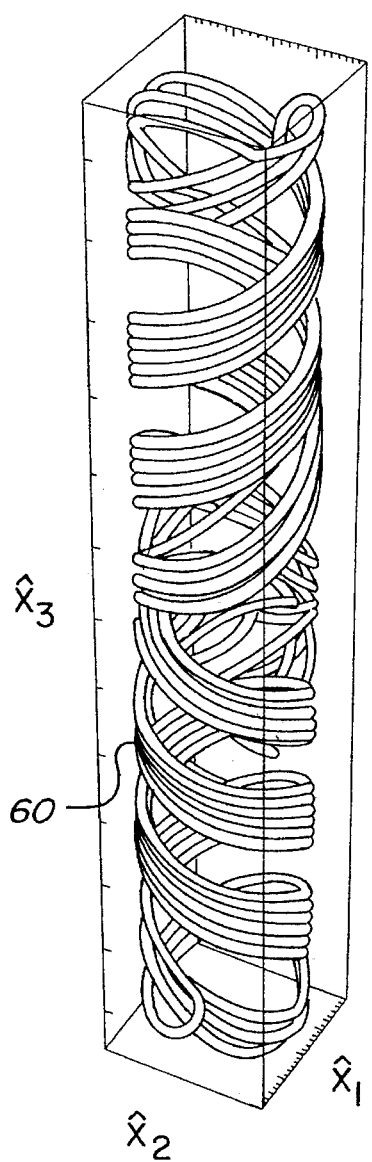
FIGS. 7A and 7B represent a schematic view, in perspective and two dimensions, of the layout of improved torsion sensor using circular connecting paths.
Figure 7B:
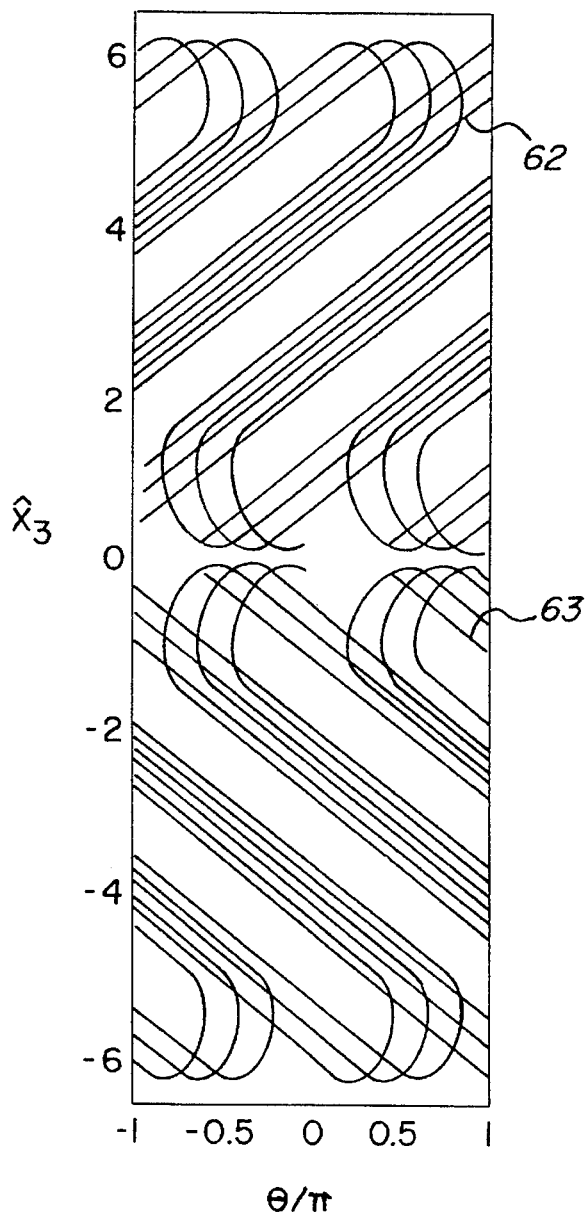

Unfortunately, increasing the number of sets 'k' times, in effect enlarging the path length, increases the number of fiber connections between the cylinder and the external interferometer by "4k" times. Since the connections are a large source of error for a Mach-Zender interferometer, this limits the practicality of this device. FIGS. 7A and 7B shows an improved version of the torsion transducer 60 incorporating circular connecting paths between the helixes. This entire torsion transducer is Constructed of only two paths 62, and 63. The circular connecting paths are chosen because their geometry allows the helical paths to be connected simply, i.e. covering a small surface area on the cylinder, without a discontinuity in slope at any point along the path.

For this improved transducer, increasing the number of helical winds 'k' times increases the signal 'k' times while still requiring only four connections. Thus the sensitivity of the transducer increases linearly with the number of paths. However, some additional error is introduced by allowing the fibers to overlap as well as the additional strain measured by the circular paths.

Figure 8A:
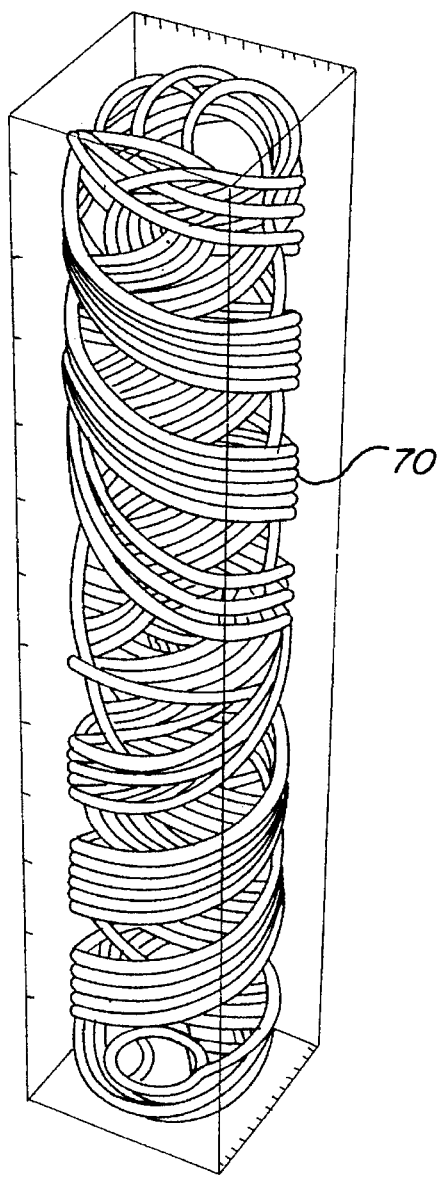
FIG. 8A is a three dimensional view of a solid fiber optic torsion transducer.
Figure 8B:
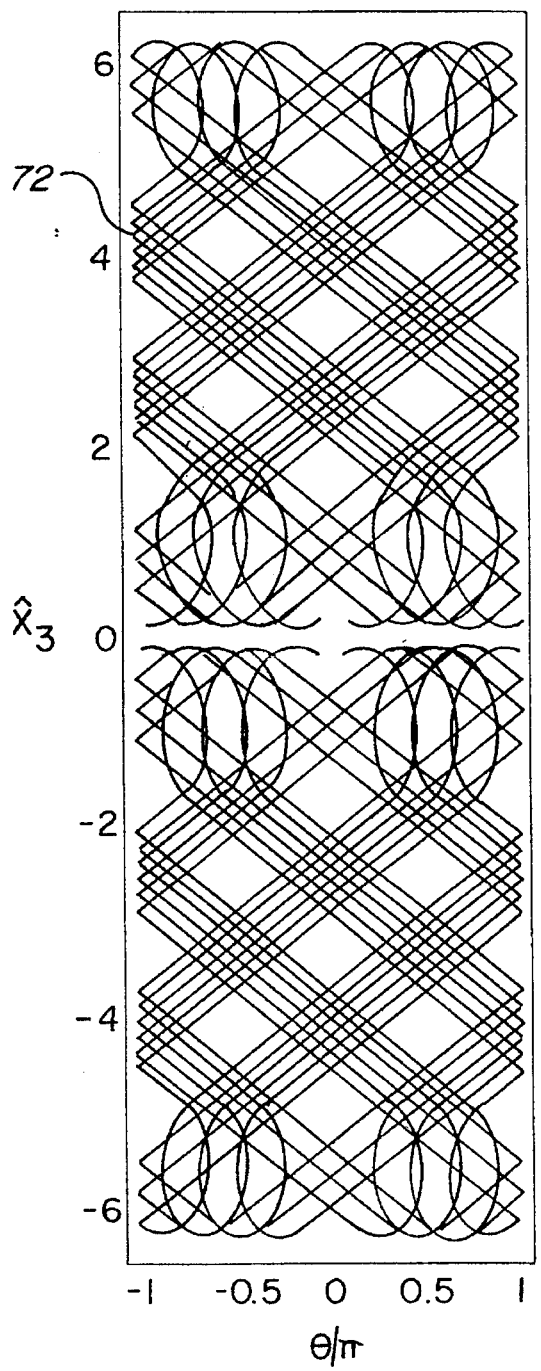
FIG. 8B is a surface representation of the same transducer.

Perhaps the best method to increase the path length without increasing the size of the instrument is to include as many helical sensors 72 as possible until the surface of the cylinder is covered with fibers. At this point, the actual cylinder is no longer required for placing the sensing fibers as they could be bonded to one another. One could imagine an "elastic cylinder" constructed of fibers bonded together rather than the previous design of a cylinder with fibers placed on its surface. Through overlaying several layers of fibers a "solid" fiber optic torsion sensor 70 would be constructed as shown in FIGS. 8A and 8B. If the fibers were imbedded in a matrix with the same modulus (but different index of refraction) the Cartesian strain tensor would still be valid under the St. Venant assumption.

If used as a load bearing element in a larger structure such a sensor would truly be a "smart structure" in the sense that the element could measure the loading applied through it. However, once the fibers are embedded through this layering technique the coefficients $C_{12}$ and $C_{22}$ can no longer be neglected when determining the average strain for a given path. Thus further analysis treating the fibers as full 3-D sensors rather than using the 2-D assumptions of this description would need to be completed.

The prismatic tube with circular cross-section is also potentially useful for transducers other than a six-component loadcell.

Figure 9B:
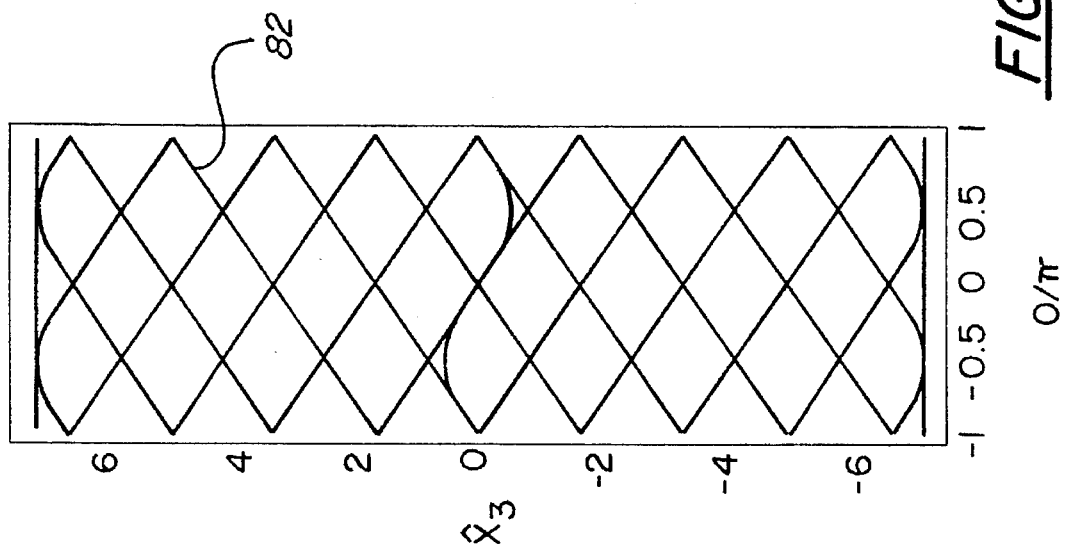
FIG. 9B is a surface view of the same configuration.
Figure 9A:
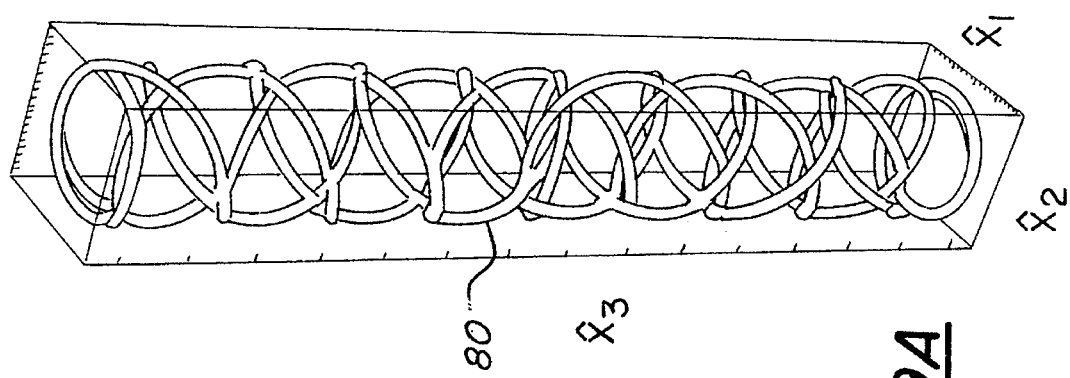

FIGS. 9A and 9B shows the sensor paths 82 of a transducer 80 that measures the axial acceleration (in the $\hat{x}_3$ direction) of the cylinder independent of the resultant loads on the end face. This transducer consists of helical paths connected by elliptical paths near the ends and center of the cylinder. The signal coefficient of the acceleration for the helical paths is given by equation 18. Note that signal coefficient again scales with the length of the cylinder. Analogous with the comparison in the previous section between electrical and optical load transducers, this optical linear accelerometer retains a geometric scaling an electrical accelerometer lacks.

Figure 10:
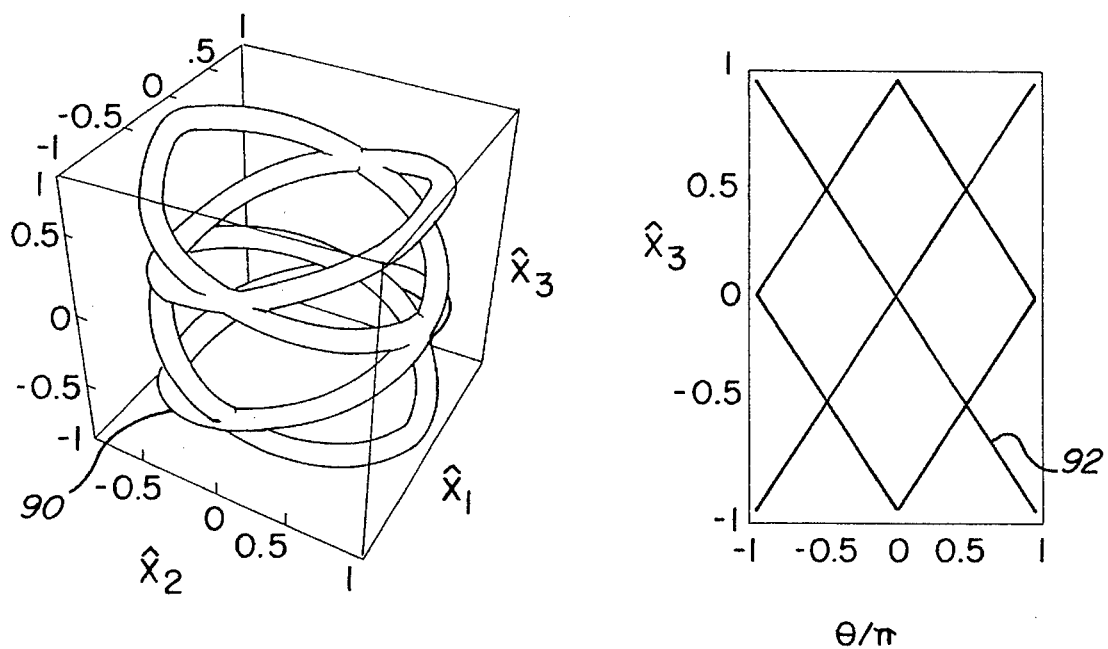
FIG. 10 is a schematic view of the layout of a "null" transducer, including both perspective and surface views thereof.

Combining helical paths 90 in the manner shown in FIG. 10 yields a "null" transducer 92. This transducer is "null" in the sense that the phase measurement is invariant with respect to all loading shown in FIG. 1 as well as uniform temperature changes.

This null sensor has several potential applications. It could be used as a technique to measure the validity of the St. Venant solution for an elastic cylinder and the validity of our assumed form of response of a glass fiber, equation 4.

This set of paths could be configured to be sensitive to an angular rate via the Sagnac effect. This would involve insuring the light traversing the two sets of paths travel in opposite rotational directions about the axis of the cylinder. This instrument would then form a Sagnac interferometer employing two independent paths. This is perhaps an uninteresting example because current Sagnac interferometers make use of a single path (thereby achieving load invariance) by the use of two beam splitters.

This "null" sensor could also be viewed as a "structural integrity" measurement device in the following sense: the fact that the phase change along the two paths is zero for all the considered types of loads is intimately related to the configuration of the structure. If the structure were to deviate from its assumed shape (e.g. a crack were to form, not necessarily intersecting a fiber) the phase along the two paths would become imbalanced, thus detecting the presence of such a structural flaw. Thus, a single sensor could be used to check the integrity of a long structure.

I claim:

1. The load measuring transducer comprising a loadable structure, at least two energy-conductive strands mounted to said structure in a predetermined three dimensional geometric relation to said structure, each said conductive strand having a geometrically distinct path in relation to said structure, and means for comparing the propagation of energy through said conductive strands in response to strain imposed on said structure.

2. The apparatus of claim 1, wherein said predetermined geometric path of each said conductive strands comprises a helix.

3. The apparatus of claim 1, wherein said predetermined geometric path of each of said conductive strands comprises a sequence of half elipses, wherein each half elipse varies in inclination from each adjacent half elipse.

4. The apparatus of claim 1, wherein said predetermined geometric path of each said conductive strands comprises the intersection of a first cylinder normal to and with a second cylinder.

5. A load measuring transducer comprising a loadable structure, at least two optical fibers mounted to said structure and a predetermined three dimensional geometric relation to said structure, each said fiber having a geometrically distinct path in relation to said structure, and means for comparing the propagation of energy through said optical fibers in response to the strain imposed on said structure.

6. The apparatus of claim 5, wherein said predetermined geometric path of each said optical fiber comprises helix.

7. The apparatus of claim 5, wherein said predetermined geometric path of each said optical fiber comprises a sequence of half elipses, wherein each half elipse varies in inclination from each adjacent half elipse.

8. The apparatus of claim 5, wherein said predetermined geometric path of each said optical fiber comprises the intersect ion of a first cylinder normal to and with a second cylinder.

9. A load measuring transducer comprising a loadable structure, at least two electrical conductors mounted to said structure in a predetermined three dimensional geometric relation to said structure, each said conductor having geometrically distinct path in relation to said structure, and means for comparing the propagation of energy through said electrical conductors in response to strain imposed on said structure.

10. The apparatus of claim 9, wherein said predetermined geometric path of said conductors comprises a helix.

11. The apparatus of claim 9, wherein said predetermined geometric path of said conductors comprises a sequence of half elipses, wherein each half elipse varies in inclination from each adjacent half elipse.

12. The apparatus of claim 9, wherein said predetermined geometric path of said conductors comprises a the intersection of a first cylinder normal to and with a second cylinder.

* * * * *

UNITED STATES PATENT AND TRADEMARK OFFICE
CERTIFICATE OF CORRECTION

PATENT NO. : 5,481,922
DATED : January 9, 1996
INVENTOR(S) : Peter Washabaugh

It is certified that error appears in the above-indentified patent and that said Letters Patent is hereby corrected as shown below:

Column 1, before line 56, insert --SUMMARY OF THE INVENTION--;

Column 7, line 54, delete "In other words" and insert --In other words,--;

Column 9, line 47, delete "between; the helixes" and insert --between the helixes--;

Column 9, line 48, delete "Constructed" and insert --constructed--;

Column 12, line 3, delete "intersect ion" and insert --intersection--;

Column 12, line 8, delete "having" and insert --having a--.

Signed and Sealed this

Fourteenth Day of May, 1996

Attest:

BRUCE LEHMAN

*Attesting Officer*     *Commissioner of Patents and Trademarks*